United States Patent
Gao et al.

(10) Patent No.: US 11,483,759 B2
(45) Date of Patent: Oct. 25, 2022

(54) ADDRESS SENDING METHOD AND DEVICE AND STORAGE MEDIUM

(71) Applicant: ZTE Corporation, Shenzhen (CN)

(72) Inventors: Yin Gao, Shenzhen (CN); He Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/764,868

(22) PCT Filed: Oct. 9, 2018

(86) PCT No.: PCT/CN2018/109456
§ 371 (c)(1),
(2) Date: May 17, 2020

(87) PCT Pub. No.: WO2019/140955
PCT Pub. Date: Jul. 25, 2019

(65) Prior Publication Data
US 2020/0344669 A1    Oct. 29, 2020

(30) Foreign Application Priority Data
Jan. 19, 2018  (CN) .......................... 201810055170.8

(51) Int. Cl.
*H04W 48/08*    (2009.01)
*H04L 47/2483*    (2022.01)
(Continued)

(52) U.S. Cl.
CPC .......... *H04W 48/08* (2013.01); *H04L 47/2483* (2013.01); *H04W 8/005* (2013.01); *H04W 36/0016* (2013.01)

(58) Field of Classification Search
CPC ... H04L 1/0018; H04L 1/0003; H04L 1/0016; H04L 1/0009; H04L 47/2483;
(Continued)

(56) References Cited

U.S. PATENT DOCUMENTS

2012/0076120 A1    3/2012  Kovvali
2017/0208634 A1*   7/2017  Bharatia ............... H04W 76/11
(Continued)

FOREIGN PATENT DOCUMENTS

CN    101304550 A    11/2008
CN    101588570 A    11/2009
(Continued)

OTHER PUBLICATIONS

International Search Report for corresponding application PCT/CN2018/109456 filed Oct. 9, 2018; dated Jan. 7, 2019.
(Continued)

*Primary Examiner* — Jianye Wu
(74) *Attorney, Agent, or Firm* — Cantor Colburn LLP (57) ABSTRACT

Provided are an address sending method and device and a storage medium. The method includes that: one or more first address information of user plane of a RAN node is sent to a core network node through first interface signaling between the core network node and the RAN node, the first address information include a first transport layer IP address and a first GTP-TEID corresponding to the IP address.

16 Claims, 5 Drawing Sheets

(51) Int. Cl.
*H04W 8/00* (2009.01)
*H04W 36/00* (2009.01)

(58) Field of Classification Search
CPC ....... H04W 8/24; H04W 48/08; H04W 8/005; H04W 36/0016
See application file for complete search history.

(56) References Cited

U.S. PATENT DOCUMENTS

| | | | |
|---|---|---|---|
| 2018/0270894 A1* | 9/2018 | Park | H04W 92/20 |
| 2019/0254090 A1 | 8/2019 | Yang | |
| 2021/0176676 A1* | 6/2021 | Yang | H04W 36/0066 |

FOREIGN PATENT DOCUMENTS

| | | |
|---|---|---|
| EP | 2854475 A1 | 4/2015 |
| EP | 3582576 A1 | 12/2019 |
| WO | 2017078776 A1 | 5/2017 |
| WO | 2019031915 A1 | 2/2019 |
| WO | 2019191975 A1 | 10/2019 |

OTHER PUBLICATIONS

Ericsson, "Idle to connected state transition with E1", 3GPP TSG RAN WG3 Meeting #97b, Prague Czech Republic, Oct. 9-13, 2017, R3-173997.

European Search Report for corresponding application 18 900 934.3; dated Feb. 9, 2021.

* cited by examiner

One or more first address information of user plane of a RAN node is reported to an CN node through first interface signaling between the CN node and the RAN node, the first address information including a first transport layer IP address and a first GTP-TEID corresponding to the IP address

ADDRESS SENDING METHOD AND DEVICE AND STORAGE MEDIUM

CROSS-REFERENCE TO RELATED APPLICATIONS

The present disclosure is filed based upon and claims priority to Chinese Patent Application No. 201810055170.8, filed on Jan. 19, 2018, the contents of which are hereby incorporated by reference in its entirety.

TECHNICAL FIELD

The present disclosure relates to but is not limited to the field of communication, and particularly to an address sending method and device and a storage medium.

BACKGROUND

Figure 1:
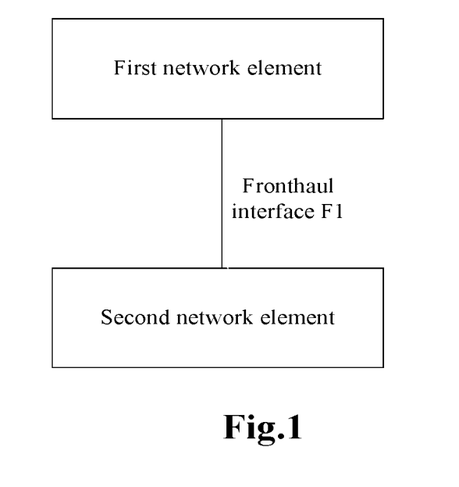
FIG. 1 is a schematic diagram of a fronthaul interface between a first network element and a second network element.

In Fifth Generation (5G) mobile communication, the large number of user connections and higher rate requirements pose technical challenges to the transmission capacity of a fronthaul interface. The fronthaul interface can be a Common Public Radio Interface (CPRI) between a Building Baseband Unit (BBU) and a Remote Radio Unit (RRU) in Long Term Evolution (LTE). Because an In-phase/Quadrature (I/Q) signal, which is subjected to processing, such as coded modulation of a Physical (PHY) layer, is transmitted through the CPRI, the CPRI requires relatively high transmission delays and bandwidth. If flow requirements of the CPRI are increased to a level, such as Terabytes per second (Tbps) level after a rate of a 5G air interface is increased to tens of Gigabytes per second (Gbps), it puts a substantial pressure on network deployment costs and leads to several other deployment difficulties. Therefore, in 5G, the way the functions of a fronthaul interface are divided or split has to be redefined. In the determining the functional split of the fronthaul interface, the transmission capacity, transmission delay, deployment convenience, and other aspects are considered. Consider that a base station may include a first network element, e.g., a Centralized Unit (CU), and a second network element, e.g., a Distributed Unit (DU). A transmission between the first network element and the second network element can be performed through an ideal or a non-ideal fronthaul interface, as shown in FIG. 1.

SUMMARY

Technical challenges with existing solutions, include that address information of multiple User Planes (UPs) cannot be sent to the core network.

Embodiments of the present disclosure provide an address sending method and device and a storage medium, to address at least such a challenge regarding sending address information of multiple user planes to the core network.

The embodiments of the present disclosure provide an address sending method, which may include that: one or more first address information of user plane of a Radio Access Network (RAN) node is sent to a CN node through first interface signaling between the CN node and the RAN node, the first address information including a first transport layer Internet Protocol (IP) address and a first General Packet Radio Service Tunneling Protocol Tunnel Endpoint Identifier (GTP-TEID) corresponding to the IP address.

The embodiments of the present disclosure also provide an address sending device, which may include:

a first sending module, configured to send one or more first address information of user plane of a RAN node to a CN node through first interface signaling between the CN node and the RAN node, the first address information including a first transport layer IP address and a first GTP-TEID corresponding to the IP address.

The embodiments of the present disclosure also provide a storage medium, in which a computer program may be stored, the computer program being configured to run to execute the address sending method provided in the embodiments of the present disclosure.

The embodiments of the present disclosure also provide an address sending device, which may include a memory and a processor. A computer program may be stored in the memory. The processor may be configured to run the computer program to execute the address sending method provided in the embodiments of the present disclosure.

In the above embodiments of the present disclosure, one or more first address information of user plane of the RAN node is sent to the core network node through second interface signaling between the core network node and the RAN node, the first address information including the first transport layer IP address and the first GTP-TEID corresponding to the IP address. Therefore, the problem that it is impossible to send a plurality of address information of user plane to the core network is solved, and the effect that the address information of the multiple UPs may be sent to the core network is further achieved.

DETAILED DESCRIPTION OF THE EMBODIMENTS

The present disclosure will be described below with reference to the drawings and in combination with the embodiments in detail. It is to be noted that the embodiments in the present application and characteristics in the embodiments may be combined without conflicts.

It is to be noted that the terms like "first" and "second" in the specification, claims, and accompanying drawings of the present disclosure are used for differentiating the similar objects but do not have to describe a specific order or a sequence.

Technical challenges with existing solutions, include that address information of multiple User Planes (UPs) cannot be sent to the core network. Embodiments of the present disclosure provide an address sending method and device and a storage medium, to address at least such a challenge regarding sending address information of multiple user planes to the core network.

For understanding the technical solutions of the following embodiments and preferred embodiments better, basic concepts involved in some embodiments will be briefly described below at first.

FIG. 1 is a schematic diagram of a fronthaul interface between a first network element and a second network element according to existing solutions. As shown in FIG. 1, the first network element performs information interaction with the second network element through the fronthaul interface. For different delays, the fronthaul may be an ideal fronthaul or a non-ideal fronthaul. A transmission delay of the ideal fronthaul is relatively short, for example, about tens to hundreds of microseconds, and a transmission delay of the non-ideal fronthaul is relatively long, for example, at a millisecond level. Due to differences between the ideal and non-ideal fronthauls, different functional splits are used for the first network element and the second network element.

Figure 2:
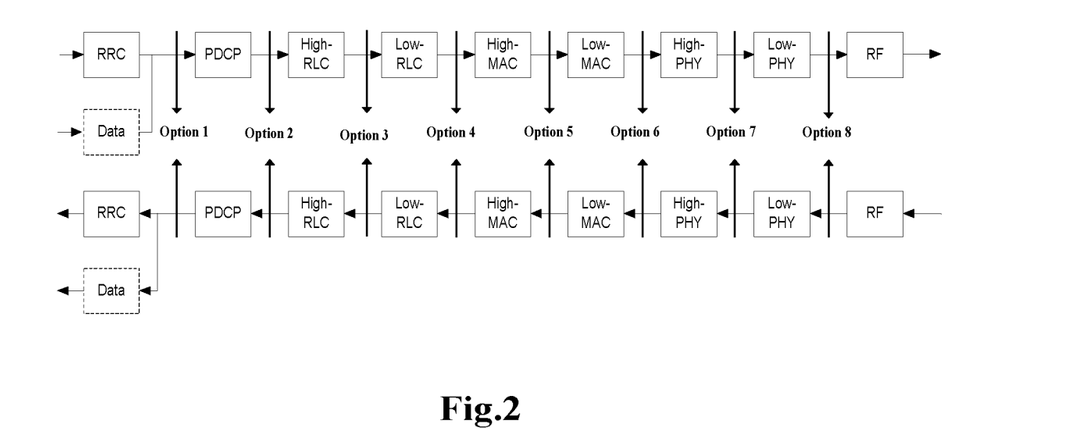
FIG. 2 is a block diagram depicting a function split of a first network element and a second network element.

FIG. 2 is depicts a function split of a first network element and a second network element typically used in existing solutions. As shown in FIG. 2, the following possible function split can be used for the first network element and the second network element.

Option 1 (Radio Resource Control (RRC)/Packet Data Convergence Protocol (PDCP) Separation, Similar to a 1A Structure):

Function separation of the option is similar to the 1A structure in Dual Connectivity (DC). RRC is positioned in a CU, and all functions of PDCP, Radio Link Control (RLC), Medium Access Control (MAC), power headroom report (PHY), Radio Frequency (RF) and the like are positioned in a DU. That is, the whole UP is positioned in the DU.

Option 2 (PDCP/RLC Separation):

Function separation of the option is similar to a 3C structure in DC. RRC and PDCP are positioned in the CU, and all the functions of RLC, MAC, PHY, RF, and the like are positioned in the DU.

Option 3 (RLC Higher-Layer/Lower-Layer Separation):

Underlying RLC (part of functions of RLC), MAC, PHY, and the RF part are positioned in the DU, and all the functions of PDCP, higher-layer RLC (part of functions of RLC) and the like are positioned in the CU.

Option 4 (RLC-MAC Separation):

MAC, PHY, and the RF part are positioned in the DU, and all the functions of PDCP, RLC, and the like are positioned in the CU.

Option 5 (Internal Separation of MAC):

Part of MAC functions (for example, Hybrid Automatic Repeat reQuest (HARQ)), PHY, and the RF part are all positioned in the DU, and other upper-layer functions are positioned in the CU.

Option 6 (RLC-PHY Separation):

MAC, PHY, and the RF part are positioned in the DU, and all the functions of PDCP, RLC, and the like are positioned in the CU.

Option 7 (Internal Separation of PHY):

Part of MAC functions (for example, HARQ), PHY, and the RF part are all positioned in the DU, and the other upper-layer functions are positioned in the CU.

Option 8 (PHY-RF Separation):

The RF part is positioned in the DU, and all the other upper-layer functions are positioned in the CU.

In FIG. 2, a first protocol entity (for example, an RRC entity) is positioned in the first network element. The first protocol entity generates control signaling, maintains at least one of creation, and modifies and releases a radio bearer. The first protocol entity also maintains parameter updating of a second protocol entity, a third protocol entity, a fourth protocol entity, and a PHY layer. A function of the second protocol layer is similar to and enhanced based on a PDCP function of an LTE system. A user may define multiple PDCP entities and may configure each PDCP entity containing UP data. Each PDCP entity contains data of a radio bearer, and the PDCP entity corresponds to a CP or a UP according to different data contained in the radio bearer. A function of the third protocol entity is similar to and enhanced based on an RLC function of LTE. A function of the fourth protocol entity is similar to and enhanced based on a MAC function of LTE. The second network element includes at least one of the second protocol entity, the third protocol entity, the fourth protocol entity, the PHY layer, and an RF unit. The first network element communicates with the second network element through a fronthaul interface.

Figure 3:
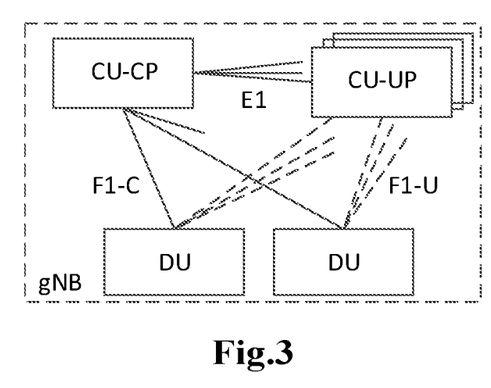
FIG. 3 is a schematic diagram depicting separation of Control Plane (CP) data and UP data of a first network element.

FIG. 3 is a schematic diagram of separating CP data and UP data of a first network element according to existing solutions. As shown in FIG. 3, two PDCPs of a UP and a CP are positioned in two different CUs. For convenient description, the two CUs are called CU-CP (CU-C) and CU-UP (CU-U), so that the UP data is separated from the CP data. Consider that an interface E1 exists between the CU-C and the CU-U and that forward interfaces F1 exist between the CUs and a DU. The forward interface between the CU-C and the DU being called F1-C and the forward interface between the CU-U and the DU being called F1-U.

Further, consider that an NG-C interface exists between the CU-C and a 5G core network, and that an NG-U interface exists between the CU-U and the core network. Also consider that the interface E1 exists between the CU-C and the CU-U and the forward interfaces F1 exist between the CUs and the DU. The interface between the CU-C and the DU is called F1-C and the interface between the CU-U and the DU is called F1-U. Therefore, when implementing user data transmission by multiple DUs, technical challenges exist in the case of CU-DU separation; and technical challenges also exist when implementing user data transmission by multiple CUs-U in the case of CP-UP separation. One of the technical challenges is that existing solutions cannot notify address information of multiple user planes serving UE to the core network. Another technical challenge is that existing solutions cannot update address information of multiple user planes. Embodiments described herein provide technical solutions to address such technical challenges.

The embodiments of the present disclosure provide an address sending method embodiment. It is to be noted that the steps shown in the flowchart of the drawings may be executed in a computer system like a set of computer executable instructions, and moreover, although a logic sequence is shown in the flowchart, in one or more embodiments, the shown or described steps may be executed in a sequence different from that described herein.

Figure 4:
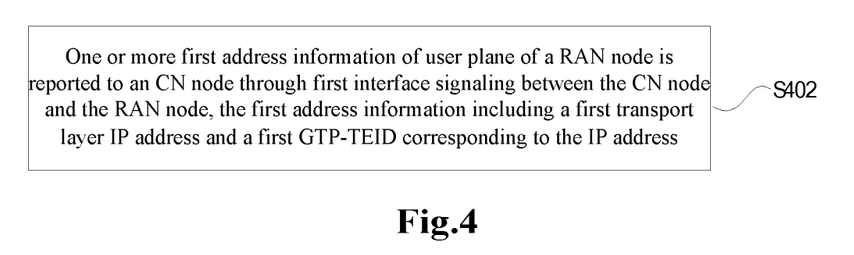
FIG. 4 is a flowchart of an address sending method according to an embodiment of the present disclosure.

FIG. 4 is a flowchart of an address sending method according to an embodiment of the present disclosure. As shown in FIG. 4, the method includes the following steps.

In S402, one or more first address information of user plane of a RAN node is sent to a CN node through a first interface signaling between the CN node and the RAN node. The first address information includes a first transport layer IP address and a first GTP-TEID (GTP=GPRS tunneling protocol; GPRS=General Packet Radio Service; TEID=tunnel endpoint identifier) corresponding to the IP address (IP=Internet Protocol).

Through this step, one or more first address information of user plane of the RAN node is sent to the CN node through the first interface signaling between the CN node and the RAN node. The first address information includes the first transport layer IP address and the first GTP-TEID corresponding to the IP address. Accordingly, a address information of a plurality of user planes can be sent to the core network. The desired effect of sending the address information of the multiple UPs to the core network is thus achieved.

In an exemplary embodiment, after the operation of sending one or more first address information of user plane of the RAN node to the CN node through the first interface signaling between the CN node and the RAN node, when the first address information is required to be updated to a second address information, the method further includes that:

the second address information of the RAN node is sent to the network through an update sending procedure. The second address information includes a second transport layer IP address and a second GTP-TEID corresponding to the second transport layer IP address.

In an exemplary embodiment, the second address information belongs to one of the following types: Protocol Data Unit (PDU) session-level UP address information, flow-level UP address information, and Data Radio Bearer (DRB)-level UP address information.

In an exemplary embodiment, the first address information is updated to the second address information in at least one of the following manners: a content of the first address information is deleted, the content of the first address information is added, and the content of the first address information is modified.

In an exemplary embodiment, second interface signaling between the CN node and the RAN node is sent through the update sending procedure, and a procedure corresponding to the second interface signaling. The second interface signaling can include at least one of a UE context modification procedure and a PDU session resource modification procedure.

In an exemplary embodiment, the first address information belongs to one of the following types: PDU session-level UP address information, flow-level UP address information, and DRB-level UP address information.

In an exemplary embodiment, at least one of the following information is sent to the RAN node through the CN node: information and session Identification (ID) required by creation of a PDU session, one or more flow IDs in a single PDU session, Quality of Service (QoS) information of a non-Guaranteed Bit Rate (non-GBR) service corresponding to a flow and QoS information of a GBR service corresponding the flow.

In an embodiment, a procedure corresponding to the first interface signaling includes, but not limited to, the following procedures: an initial UE context creation procedure, the UE context modification procedure, a PDU session resource creation procedure, and the PDU session resource modification procedure.

The methods according to the embodiment herein may be implemented using a combination of software and a hardware platform, or only using hardware. Based on such an understanding, the technical solution of the embodiment of the present disclosure substantially or parts making contributions to the related art may be embodied in form of a computer program product. The computer program product is stored in a storage medium (for example, a Read Only Memory (ROM)/Random Access Memory (RAM), a magnetic disk and an optical disk), including a plurality of instructions configured to enable a computer device (which may be a mobile phone, a computer, a server, a network device or the like) to execute the method in the embodiment of the present disclosure.

The embodiments of the present disclosure also provide an address sending device, which is configured to implement the abovementioned embodiment. What has already been described is not repeated for compactness. It should be noted that in the description herein, the term "module" can represent a combination of software and/or hardware capable of realizing a preset function. Although the device described in the following embodiment is preferably implemented with software, implementation with hardware, or a combination of the software and the hardware is also possible and conceivable.

Figure 5:
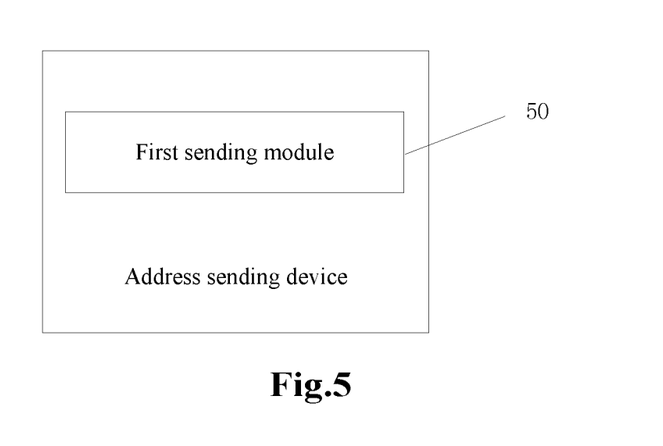
FIG. 5 is a first structure block diagram of an address sending device according to an embodiment of the present disclosure.

FIG. 5 is a block diagram of an address sending device according to an embodiment of the present disclosure. As shown in FIG. 5, the device includes:

a first sending module 50 that is configured to send one or more first address information of user plane of a RAN node to a CN node through a first interface. The first interface facilitates communication between the CN node and the RAN node. The first address information includes a first transport layer IP address and a first GTP-TEID corresponding to the IP address.

Through a function of the module, first address information of one or more user planes of the RAN node are sent to the CN node through the first interface signaling between the CN node and the RAN node. The first address information includes the first transport layer IP address and the first GTP-TEID corresponding to the IP address. The embodiment accordingly facilitates sending address information of multiple user planes to the core network by sending multiple address information to the core network.

Figure 6:
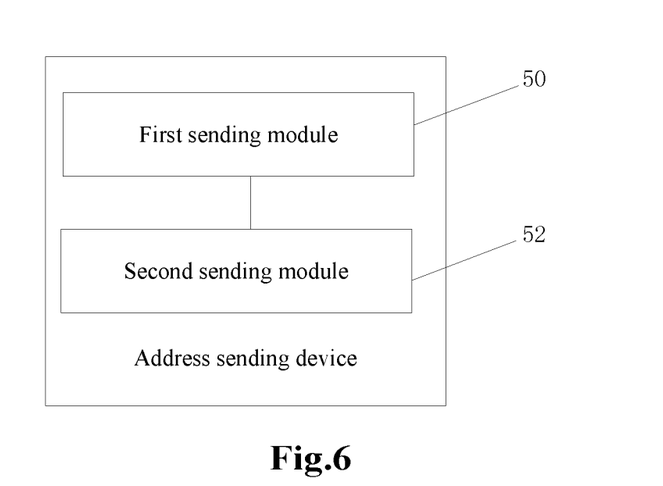
FIG. 6 is a second structure block diagram of an address sending device according to an embodiment of the present disclosure.

FIG. 6 is a block diagram of an address sending device according to an embodiment of the present disclosure. As shown in FIG. 6, the device further includes a second sending module 52, besides all the modules shown in FIG. 5.

When the first address information is to be updated to a second address information, the second sending module 52 sends the second address information of the RAN node to the core network through an update sending procedure. The second address information includes a second transport layer IP address and a second GTP-TEID corresponding to the second transport layer IP address.

In an exemplary embodiment, the second IP address information belongs to one of the following types: PDU session-level UP address information, flow-level UP address information, and DRB-level UP address information.

In an exemplary embodiment, the first address information is updated to the second address information in at least one of the following manners: a content of the first address information is deleted, the content of the first address information is added, and the content of the first address information is modified.

In an exemplary embodiment, a second interface signal between the CN node and the RAN node is sent through the update sending procedure. The update sending procedure includes, but is not limited to one of the following procedures: a UE context modification procedure and a PDU session resource modification procedure.

In an exemplary embodiment, the first address information belongs to one of the following types: PDU session-level UP address information, flow-level UP address information, and DRB-level UP address information.

In an exemplary embodiment, the second sending module 52 is further configured to send at least one of the following information to the RAN node through the CN node: information and session ID required for creation of a PDU session, one or more flow IDs in a single PDU session, QoS information of a non-GBR service corresponding to a flow, and QoS information of a GBR service corresponding to the flow.

In an exemplary embodiment, a procedure corresponding to the first interface signaling includes, but is not limited to, the following procedures: an initial UE context creation procedure, the UE context modification procedure, a PDU session resource creation procedure, and the PDU session resource modification procedure.

It is to be noted that each module may be implemented through software or hardware. In an embodiment, the modules may all be part of the same processor. Alternatively, the modules may be part of different processors in any combination.

The address sending method will be described below in combination with embodiments in practical scenarios without limiting the scope of protection of the embodiments of the present disclosure.

A RAN node sends a plurality of address information of user plane to a core network (Next Generation Core, NGC) in a downlink data transmission.

In Step 1, the NGC initiates a PDU session creation procedure through an NG interface signaling procedure. Information required for creation of a PDU session is included in the signal sent for the initiation. Such information can include a transmission address information configured for the NGC side to receive uplink data.

In Step 2, the RAN node acquires PDU session related information through an NG-interface-based PDU session creation procedure. The information required for the creation of the PDU session is included. For example, the information includes, but is not limited to, one or more of the following information: a session ID, one or more flow IDs in a single session, QoS related information of a non-GBR service corresponding to a flow, QoS related information of a GBR service corresponding to the flow, and the transmission address information configured for the NGC side to receive the uplink data. If a RAN side successfully creates the PDU session, PDU session creation success information is fed back through the NG interface signaling procedure. The success information can include one or more portions of transmission address information configured for the RAN side to receive downlink data of the NGC. Each portion of transmission address information includes an IP address and a GTP-TEID. The transmission address information may be of a PDU session level, may also be of a per flow level, and may also be of a DRB level.

In an exemplary embodiment, the RAN node may be a gNB, may also be a CU (considered in a scenario that the downlink data is implemented through multiple UPs), and may also be a CU-C (considered in a scenario that the downlink data is implemented through multiple CUs-U).

In an exemplary embodiment, the NG interface signaling procedure includes, but not limited to, the following procedures: initial context creation, a PDU session resource creation procedure and a PDU session resource modification procedure. A response message of the procedure includes the one or more portions of transmission address information configured for the RAN side to receive the downlink data of the NGC.

In an exemplary embodiment, the transmission address information configured for the RAN side to receive the downlink data of the NGC may be data transmission address information of a gNB. Alternatively, the transmission address information may be data transmission address information of a CU-U. In another embodiment, the transmission address information may be data transmission address information of a DU.

Further, the RAN node sends a plurality of address information of user plane to a core network (Next Generation Core, NGC) via an updated downlink data transmission.

In Step 1, if the transmission address information for the RAN side receiving the downlink data of the core network changes, the RAN node initiates an update procedure to notify the core network. An update request message includes one or more pieces of transmission address information configured for the RAN side to receive the downlink data of the core network. Each portion of transmission address information includes an IP address and a GTP-TEID. The transmission address information may be of a PDU session level, of a per flow level, or may also be of a DRB level.

In Step 2, the core network receives the update request message, and performs local processing. If the processing succeeds, the core network responds with an update acknowledgement message and transmits the data according to the new transmission address information provided by the RAN side. Alternatively, if the processing fails, the core network responds with an update failure message.

In an exemplary embodiment, the RAN node may be a gNB, a CU, or a CU-C.

In an exemplary embodiment, an NG interface signaling procedure includes, but not limited to, the following procedures: a PDU session resource notification procedure, and a PDU session resource modification indication procedure. A request message of the procedure includes one or more portions of transmission address information configured for the RAN side to receive the downlink data of the core network.

In an exemplary embodiment, the transmission address information configured for the RAN side to receive the downlink data of the core network may be data transmission address information of a gNB. Alternatively, the transmission address information may be data transmission address information of a CU-U. In another embodiment, the transmission address information may be data transmission address information of a DU.

The UP address information sending and updating methods disclosed in the embodiments of the present disclosure facilitate data transmission of multiple UP nodes on the RAN side. Consequently, multiple UPs may serve UE, and UP data transmission of the core network may change according to a dynamic change of the UP.

Figure 7:
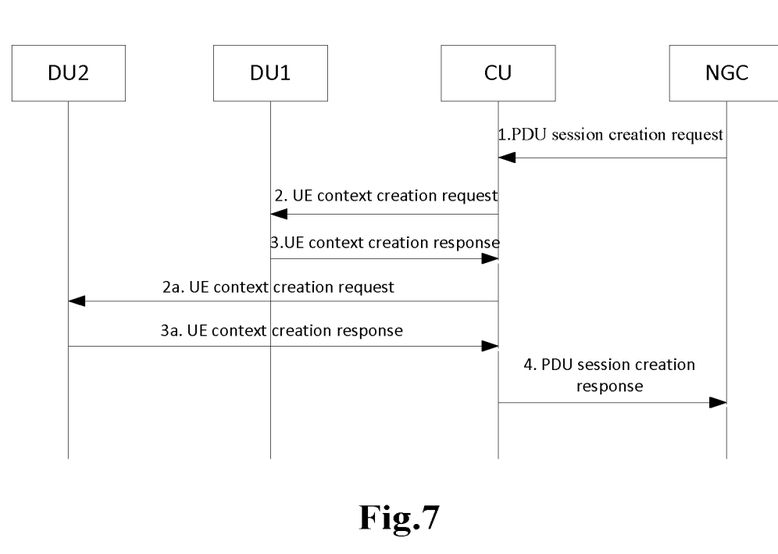
FIG. 7 is a schematic diagram of transmitting UP data provided for User Equipment (UE) by multiple DUs in a CU-DU separation scenario according to an embodiment of the present disclosure.

FIG. 7 is a schematic diagram of a method for transmitting UP data provided for UE by multiple DUs in a CU-DU separation scenario according to an embodiment of the present disclosure.

In Step 1, an NGC initiates a PDU session creation procedure through an NG interface signaling procedure.

Information required for creation of a PDU session is included, including transmission address information configured for the NGC side to receive uplink data.

In Step 2/2a, a CU acquires PDU session related information through an NG-interface-based PDU session creation procedure. The information required for creation of the PDU session is included. Such information can include, but not limited to, one or more of the following information: a session ID, one or more flow IDs in a single session, QoS related information of a non-GBR service corresponding to a flow, QoS related information of a GBR service corresponding to the flow, and the transmission address information configured for the NGC side to receive the uplink data. The CU initiates a UE context creation request message to one or more DUs through interfaces F1.

In Step 3/3a, the DU implements local Resource Block (RB) resource allocation. In case of successful processing, the DU sends a UE context creation response message to the CU through the interface F1. The context creation response message includes one or more portions of transmission address information for receiving downlink data.

In Step 4, if the RAN side successfully creates the PDU session. The CU responds to the DU with PDU session creation success information through an NG interface signaling procedure. The response includes the transmission address information configured for the one or more DUs to receive the downlink data of the NGC. Each portion of transmission address information includes an IP address and a GTP-TEID. The transmission address information may be of a PDU session level, a per flow level, or of a DRB level.

In an exemplary embodiment, the NG interface signaling procedure includes, but not limited to, the following procedures: initial context creation, a PDU session resource creation procedure, and a PDU session resource modification procedure. A response message of the procedure includes the transmission address information configured for the one or more DUs to receive the downlink data of the NGC.

Figure 8:
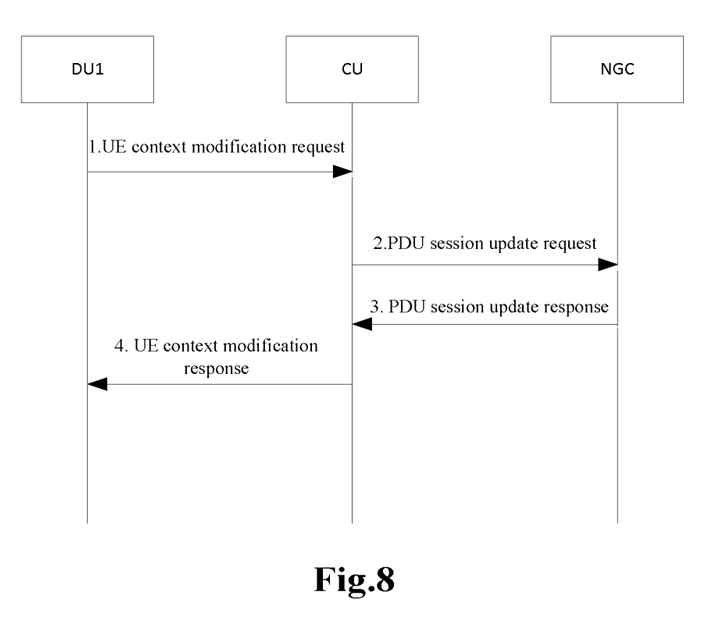
FIG. 8 is a schematic diagram of transmitting UP data provided for UE by multiple DUs in a CU-DU separation scenario according to an embodiment of the present disclosure.

FIG. 8 is a schematic diagram of transmitting UP data provided for UE by multiple DUs in a CU-DU separation scenario according to an embodiment of the present disclosure.

In Step 1, a DU initiates an update procedure to notify a CU if a transmission address information changes, where the transmission address information is configured for one or more DUs to serve a UE to receive downlink data of a core network. An update request message includes the transmission address information configured for the one or more DUs to receive the downlink data of the core network.

In Step 2, the CU, after receiving the UE context update request message, performs local processing. Or the other condition is that: the CU locally adds or deletes one or more DUs simultaneously serving the UE, and the CU initiates the update procedure to notify the core network. The update request message includes the transmission address information configured for the one or more DUs to receive the downlink data of the core network. Each piece of transmission address information includes an IP address and a GTP-TEID. The transmission address information may be of a PDU session level, a per flow level, or a DRB level.

In Step 3, the core network receives the update request message, and performs local processing. If the local processing succeeds, the core network sends back an update acknowledgement message and transmits the data according to the new transmission address information provided by the RAN side. Alternatively, if the local processing fails, the core network sends back an update failure message.

In Step 4, the CU sends a UE context update response message to the DU according to a response message of the core network.

In an embodiment, Step 4 may be executed simultaneously with Step 2 after Step 1.

In an exemplary embodiment, an NG interface signaling procedure includes, but not limited to, the following procedures: a PDU session resource notification procedure and a PDU session resource modification indication procedure. A request message of the procedure includes the transmission address information configured for the one or more DUs to receive the downlink data of the core network.

Figure 9:
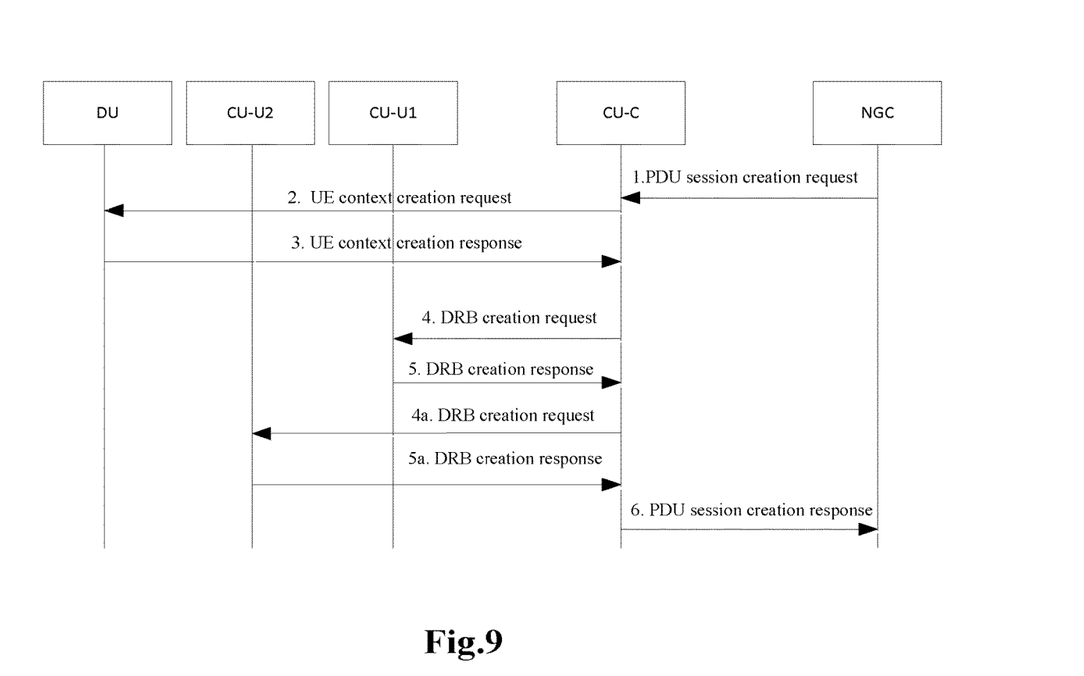
FIG. 9 is a schematic diagram of transmitting UP data provided for UE by multiple CUs-U in a CP/UP separation scenario according to an embodiment of the present disclosure.

FIG. 9 is a schematic diagram of transmitting UP data provided for UE by multiple CUs-U in a CP/UP separation scenario according to an embodiment of the present disclosure.

In Step 1, an NGC initiates a PDU session creation procedure through an NG interface signaling procedure. Information required for creation of a PDU session is included in such an update PDU session creation request. Such information includes transmission address information configured for an NGC side to receive uplink data.

In Step 2, a CU-C acquires the PDU session related information through an NG-interface-based PDU session creation procedure. The information required for creation of the PDU session is included in the received request. Such information includes, but not limited to, one or more of the following information: a session ID, one or more flow IDs in a single session, QoS related information of a non-GBR service corresponding to a flow, QoS related information of a GBR service corresponding to the flow, and the transmission address information configured for the NGC side to receive the uplink data. The CU-C, in response, initiates a UE context creation request message to a DU through an interface F1.

In Step 3, the DU, after locally creating a UE context, sends a UE context creation response message to the CU-C through the interface F1.

In Step 4/4a, the CU-C initiates a DRB creation request message to one or more CUs-U through the interface E1.

In Step 5/5a, the CU-U sends a DRB creation response message to the CU through the interface E1. One or more portions of the transmission address information sent by a CU-U side for receiving downlink data of the NGC is included in the DRB creation response message.

In Step 6, if the RAN side successfully creates the PDU session, the CU-C sends back PDU session creation success information through an NG interface signaling procedure. The PDU session creation success information includes transmission address information configured for the one or more CUs-U to receive the downlink data of the NGC. Each portion of transmission address information includes an IP address and a GTP-TEID. The transmission address information may be of a PDU session level, a per flow level, or a DRB level.

In an exemplary embodiment, the NG interface signaling procedure includes, but not limited to, the following procedures: initial context creation, a PDU session resource creation procedure, and a PDU session resource modification procedure. A response message of the procedure includes the transmission address information configured for the one or more CUs-U to receive the downlink data of the core network.

Figure 10:
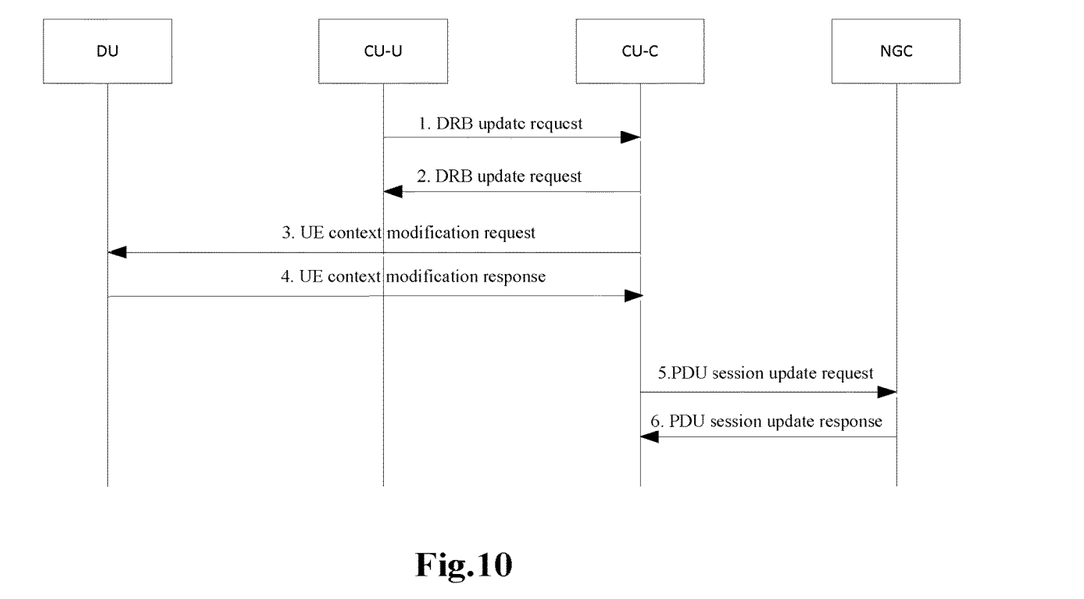
FIG. 10 is a schematic diagram of transmitting UP data provided for UE by multiple CUs-U in a CP/UP separation scenario according to an embodiment of the present disclosure.

FIG. 10 is a schematic diagram of transmitting UP data provided for UE by multiple CUs-U in a CP/UP separation scenario according to an embodiment of the present disclosure.

In Step 1, if transmission address information configured for one or more CUs-U serving UE to receive downlink data of an NGC changes, the CU-U initiates a DRB modification procedure to notify a CU-C. A DRB modification request message includes the transmission address information configured for the one or more CUs-U to receive the downlink data of the NGC.

In Step 2, the CU-C sends a DRB modification response message to the CU-U.

In Step 3, after the CU-C receives a UE context update request message, the CU-C locally performs CU-U deletion and modification processing. The CU-C initiates a UE context modification procedure to a DU to notify updated uplink data transmission address information of a DRB to the DU.

In Step 4, the DU locally updates a UE context and sends a UE context update response message to the CU-C.

In Step 5, the CU-C initiates an update procedure to notify the core network. An update request message includes the transmission address information configured for the one or more CUs-U to receive the downlink data of the core network. Each piece of transmission address information includes an IP address and a GTP-TEID, and the transmission address information may be of a PDU session level, may also be of a per flow level and may also be of a DRB level.

In Step 6, the core network receives the update request message, and performs local processing. If the local processing succeeds, the core network sends back an update acknowledgement message and transmits the data according to the new transmission address information provided by the RAN side. Alternatively, if the local processing fails, the core network sends back an update failure message.

In an exemplary embodiment, the NG interface signaling procedure includes, but not limited to, the following procedures: a PDU session resource notification procedure and a PDU session resource modification indication procedure. A request message of the procedure includes the transmission address information configured for the one or more CUs-U to receive the downlink data of the core network.

Accordingly, embodiments of the present disclosure, through the interface signaling procedure, facilitate sending a plurality of address information of user plane. Further, the technical solutions facilitated by the embodiments include sending updated address information. Further yet, management of data transmission of multiple UP nodes on the RAN side is further facilitated. Additionally, using embodiments herein, multiple UPs can serve the UE, and UP data transmission of the core network may change according to the dynamic change of the UP.

In an exemplary embodiment, the storage medium may be configured to store a computer program configured to execute the following step.

In S1, one or more first address information of user plane of a RAN node is sent to an NGC node through first interface signaling between the NGC node and the RAN node. The first address information includes a first transport layer IP address and a first GTP-TEID corresponding to the IP address.

In an exemplary embodiment, the storage medium is further configured to store a computer program configured to execute the following step.

In S2, second address information of the RAN node is sent to the core network through an update sending procedure. The second address information includes a second transport layer IP address and a second GTP-TEID corresponding to the second IP address.

In an exemplary embodiment, the storage medium may include, but not limited to, various medium capable of storing computer programs such as a U disk, a ROM, a RAM, a mobile hard disk, a magnetic disk or an optical disk.

The embodiments of the present disclosure also provide an address sending device, which includes a memory and a processor. A computer program is stored in the memory. The processor is configured to run the computer program to execute the address sending method provided in the embodiments of the present disclosure.

In an exemplary embodiment, the address sending device may further include a transmission device and an input/output device. The transmission device is connected with the processor, and the input/output device is connected with the processor.

It is apparent that those skilled in the art should know that each module or each step of the present disclosure may be implemented through a computing device. The modules may all be part of a single computing device or may be distributed in a network formed by multiple computing devices. In an embodiment, the modules described herein may be implemented by program codes executable by the computing devices. The program codes may be stored in one or more storage devices for execution by the computing devices. Moreover, in some cases, the shown or described steps may be executed in sequences different from those described here, or may form various integrated circuit modules respectively. In one or more embodiments, multiple modules or steps herein may form a single integrated circuit module. Therefore, the present disclosure is not limited to any specific hardware and software combination.

Described herein are some embodiments of the present disclosure, which are not intended to limit the present disclosure. For those skilled in the art, the description of the embodiments present disclosure can provide obvious various modifications and variations. Any modifications, equivalent replacements, improvements and the like made within the principle of the present disclosure shall fall within the scope of protection of the present disclosure.

What is claimed is:

1. An address sending method, comprising:
   sending a plurality first address information of User Plane (UP) of a Radio Access Network (RAN) node to a Core Network (CN) node through first interface signaling between the CN node and the RAN node, the plurality of the first address information is used for receiving downlink data from a core network, and each of the first address information comprising a first transport layer Internet Protocol (IP) address and a first General Packet Radio Service Tunneling Protocol Tunnel Endpoint Identifier (GTP-TEID) corresponding to the IP address;
   in a CP/UP separated and multiple DUs scenario, the RAN node is a CU, and the plurality of the first address information is address information for DUs to receive the downlink data from the core network;
   or, in a CP/UP separated and multiple CUs-U scenario, the RAN node is a CU-C, and the plurality of the first address information is address information for CUs-U to receive the downlink data from the core network;
   after sending the first address information of the a plurality UPs of the RAN node to the CN node through the first interface signaling between the CN node and the RAN node, when the first address information is required to be updated to second address information, further comprising:

sending the second address information of the RAN node to the CN through an update sending procedure, the second address information comprising a second transport layer IP address and a second GTP-TEID corresponding to the IP address.

2. The method as claimed in claim 1, wherein the first address information belongs to one of the following types: PDU session-level UP address information, flow-level UP address information, DRB-level UP address information.

3. An address sending device, comprising a memory and a processor, wherein a computer program is stored in the memory; and the processor is configured to run the computer program to execute the address sending method as claimed in claim 2.

4. The method as claimed in claim 1, wherein
at least one of the following information is sent to the RAN node through the CN node: information required by creation of a PDU session, a session Identification (ID) required by creation of a PDU session, a plurality flow IDs in a single PDU session, Quality of Service (QoS) information of a non-Guaranteed Bit Rate (non-GBR) service corresponding to a flow, QoS information of a GBR service corresponding to a flow.

5. An address sending device, comprising a memory and a processor, wherein a computer program is stored in the memory; and the processor is configured to run the computer program to execute the address sending method as claimed in claim 4.

6. The method as claimed in claim 1, wherein a procedure corresponding to the first interface signaling comprises at least one of the followings:
an initial UE context creation procedure, the UE context modification procedure, a PDU session resource creation procedure and the PDU session resource modification procedure.

7. An address sending device, comprising a memory and a processor, wherein a computer program is stored in the memory; and the processor is configured to run the computer program to execute the address sending method as claimed in claim 6.

8. A non-transitory storage medium, in which a computer program is stored, the computer program running to execute the address sending method as claimed in claim 1.

9. An address sending device, comprising a memory and a processor, wherein a computer program is stored in the memory; and the processor is configured to run the computer program to execute the address sending method as claimed in claim 1.

10. The method as claimed in claim 1, wherein the second address information belongs to one of the following types: Protocol Data Unit (PDU) session-level UP address information, flow-level UP address information, Data Radio Bearer (DRB)-level UP address information.

11. An address sending device, comprising a memory and a processor, wherein a computer program is stored in the memory; and the processor is configured to run the computer program to execute the address sending method as claimed in claim 10.

12. The method as claimed in claim 1, wherein
the first address information is updated to the second address information in at least one of the following manners: a content of the first address information is deleted, a content of the first address information is added, and a content of the first address information is modified.

13. An address sending device, comprising a memory and a processor, wherein a computer program is stored in the memory; and the processor is configured to run the computer program to execute the address sending method as claimed in claim 12.

14. The method as claimed in claim 1, wherein second interface signaling between the CN node and the RAN node is sent through the update sending procedure, a procedure corresponding to the second interface signaling comprising: a User Equipment (UE) context modification procedure, a PDU session resource modification procedure.

15. An address sending device, comprising a memory and a processor, wherein a computer program is stored in the memory; and the processor is configured to run the computer program to execute the address sending method as claimed in claim 14.

16. An address sending device, comprising:
a first sending module, configured to send a plurality first address information of User Plane (UP) of a Radio Access Network (RAN) node to a Core Network (CN) node through first interface signaling between the CN node and the RAN node, the plurality of the first address information is used for receiving downlink data from a core network, and each of the first address information comprising a first transport layer Internet Protocol (IP) address and a first General Packet Radio Service Tunneling Protocol Tunnel Endpoint Identifier (GTP-TEID) corresponding to the IP address;
in a CP/UP separated and multiple DUs scenario, the RAN node is a CU, and the plurality of the first address information is address information for DUs to receive the downlink data from the core network;
or, in a CP/UP separated and multiple CUs-U scenario, the RAN node is a CU-C, and the plurality of the first address information is address information for CUs-U to receive the downlink data from the core network;
when the first address information is required to be updated to second address information, further comprising:
a second sending module, configured to send the second address information of the RAN node to the core network through an update sending procedure, the second address information comprising a second transport layer IP address and a second GTP-TEID corresponding to the IP address.

* * * * *